United States Patent [19]
Yung et al.

[11] Patent Number: 5,860,357
[45] Date of Patent: Jan. 19, 1999

[54] BREADMAKER

[75] Inventors: Jimmy Siu Yim Yung, Tai Wai; John Duncan McNair, Yuen Long, both of Hong Kong

[73] Assignee: Chiaphus Industries, Limited, Hong Kong, Hong Kong

[21] Appl. No.: 911,696

[22] Filed: Aug. 15, 1997

Related U.S. Application Data

[63] Continuation-in-part of Ser. No. 805,369, Feb. 24, 1997, Pat. No. 5,826,495.

[51] Int. Cl.$^6$ ................ A21D 1/00; A21D 8/00; A47J 27/00; A47J 37/00
[52] U.S. Cl. ................ 99/348; 99/468; 366/98; 366/146; 366/314
[58] Field of Search ................ 99/348, 368, 467, 99/326–333, 352, 353, 483, 468; 366/144–146, 149, 96–98, 69, 205, 314, 343, 601

[56] References Cited

U.S. PATENT DOCUMENTS

| | | |
|---|---|---|
| 4,903,587 | 2/1990 | Nagasaka et al. .................. 99/325 |
| 4,903,588 | 2/1990 | Horiuchi et al. .................. 99/348 |
| 4,903,589 | 2/1990 | Aoyama .................. 99/348 |
| 4,977,822 | 12/1990 | Seo et al. .................. 366/98 X |
| 4,984,512 | 1/1991 | Takahashi et al. .................. 99/327 |
| 5,351,606 | 10/1994 | Matsuzaki .................. 99/348 |
| 5,392,695 | 2/1995 | Junkel .................. 99/328 |
| 5,410,949 | 5/1995 | Yung .................. 366/146 X |
| 5,433,139 | 7/1995 | Kitagawa et al. .................. 99/327 |
| 5,435,235 | 7/1995 | Yoshida .................. 99/327 |
| 5,445,061 | 8/1995 | Barradas .................. 366/146 X |
| 5,493,955 | 2/1996 | Belongia et al. .................. 99/352 X |
| 5,590,583 | 1/1997 | Harrison .................. 219/400 X |

*Primary Examiner*—Timothy F. Simone
*Attorney, Agent, or Firm*—Miller, Sisson, Chapman & Nash, P.C.

[57] ABSTRACT

A breadmaker having a container sealingly mounted to the top of a housing and an electric heating element is mounted to an outside surface. A paddle is mounted at the bottom of the container and driven in use by an electric motor. Because the container is sealed in place in the housing, no foodstuff can enter the housing. Because the heating of the container is direct, less heat is wasted. The paddle may be lifted at the end of the baking cycle to aid removal of the cooled bread loaf. A hinged lid that is partially opened by a spring biassed plunger at the end of each baking cycle allows for ventilation of the container.

4 Claims, 5 Drawing Sheets

BREADMAKER

This is a continuation-in-part application of U.S. patent application Ser. No. 08/805,369, filed Feb. 24, 1997, now U.S. Pat. No. 5,826,495.

BACKGROUND OF THE INVENTION

This invention relates to breadmakers, and more particularly to a breadmaker providing a ventilation system after the baking cycle.

There are already many electrical breadmakers available for making individual loaves of bread in the home. In each case the baking ingredients are normally placed in a bread pan or a container which is lowered into a compartment that is heated by an electrical element fitted in the compartment. The container includes a dough hook or paddle that can be mechanically coupled to a motor mounted below the container in the compartment. A bread making cycle usually includes a first mixing and kneading phase, an interval to allow the bread mix to rise, a second kneading phase and a second interval for a second rise, and finally a baking phase. Once the bread is baked the finished loaf and usually the container are removed from the compartment.

It is possible that some bread making ingredients are spilled outside the container and fall inside the compartment requiring special care when loading the container and difficulty in keeping the compartment clean. Spilled ingredients can become baked onto the surfaces of the compartment and difficult to remove. The heating of the container is also indirect, leading to inherent loss of heat, and indeed often general heating of the external surfaces of the breadmaker.

SUMMARY OF THE INVENTION

It is an object of the invention to overcome or at least reduce these disadvantages.

According to the invention there is provided an electric breadmaker comprising a container for receiving bread mix which is sealingly mounted to a top of a housing, heating means arranged to heat the outer surface of the container for heating bread mix in the container, a paddle in the bottom of the container for connection to a mechanical drive that extends through a central aperture therein into the housing, and an electric motor arranged to be coupled to the mechanical drive for rotating the paddle.

One embodiment includes a ventilating means automatically openable to vent the container at the end of a baking cycle.

The heating means may comprise an electric element surrounding the outside of the container in close proximity therewith. Preferably, the heating element is mounted adjacent a top surface of the container.

The breadmaker may have a lid that closes over the top of the housing and has a lower surface formed or heat conducting material to receive and transmit heat in use from the heating element generally downwards into the container.

The lid may be attached to a top of the container and an operating plunger mounted at a side of the container which is arranged to partially open the lid to provide the ventilating means.

Preferably, lifting means are provided for selectively raising a bread loaf to aid removal of a finished loaf of bread from the container.

The lifting means may comprise an air jet in a lower surface of the container.

The lifting means may be arranged to be applied to the paddle. The lifting means may comprise a mechanical lever arrangement manually operable from externally of the housing and arranged to apply an upward force to the paddle. Alternatively, the paddle may be coupled to the mechanical drive by a screw thread and lifting is achieved by driving the paddle in an opposite direction to its normal operating direction whereby unscrewing the paddle to cause the paddle to move upwards.

According to another aspect of the invention there is provided an electrical breadmaker comprising a container for receiving bread mix which is sealingly mounted to a top of a housing, heating means arranged to heat the outer surface of the container for heating bread mix in the container, a paddle in the bottom of the container for connection to a mechanical drive that extends through a central aperture therein into the housing, and an electric motor arranged to be coupled to the mechanical drive for rotating the paddle, including lifting means applied to the paddle for raising a bread loaf after baking comprising a threaded prong supporting the paddle and entered into a threaded paddle driving boss which is arranged to unscrew and life the paddle whenever the driving boss is rotated in a reverse direction.

According to a further aspect of the invention there is provided an electrical breadmaker comprising a container for receiving bread mix which is sealingly mounted to a top of a housing, heating means arranged to heat the outer surface of the container for heating bread mix in the container, a paddle in the bottom of the container for connection to a mechanical drive that extends through a central aperture therein into the housing, and an electric motor arranged to be coupled to the mechanical drive for rotating the paddle, including a circular geared disc mounted below the container having a central shaft mechanically coupled to drive the paddle, and an electric motor having a rotor with worm drive mounted at one end to couple to the geared disc.

BRIEF DESCRIPTION OF THE DRAWINGS

Breadmakers according to the invention will now be described by way of example with reference to the accompanying schematic drawings.

DESCRIPTION OF THE PREFERRED EMBODIMENT

Figure 1:
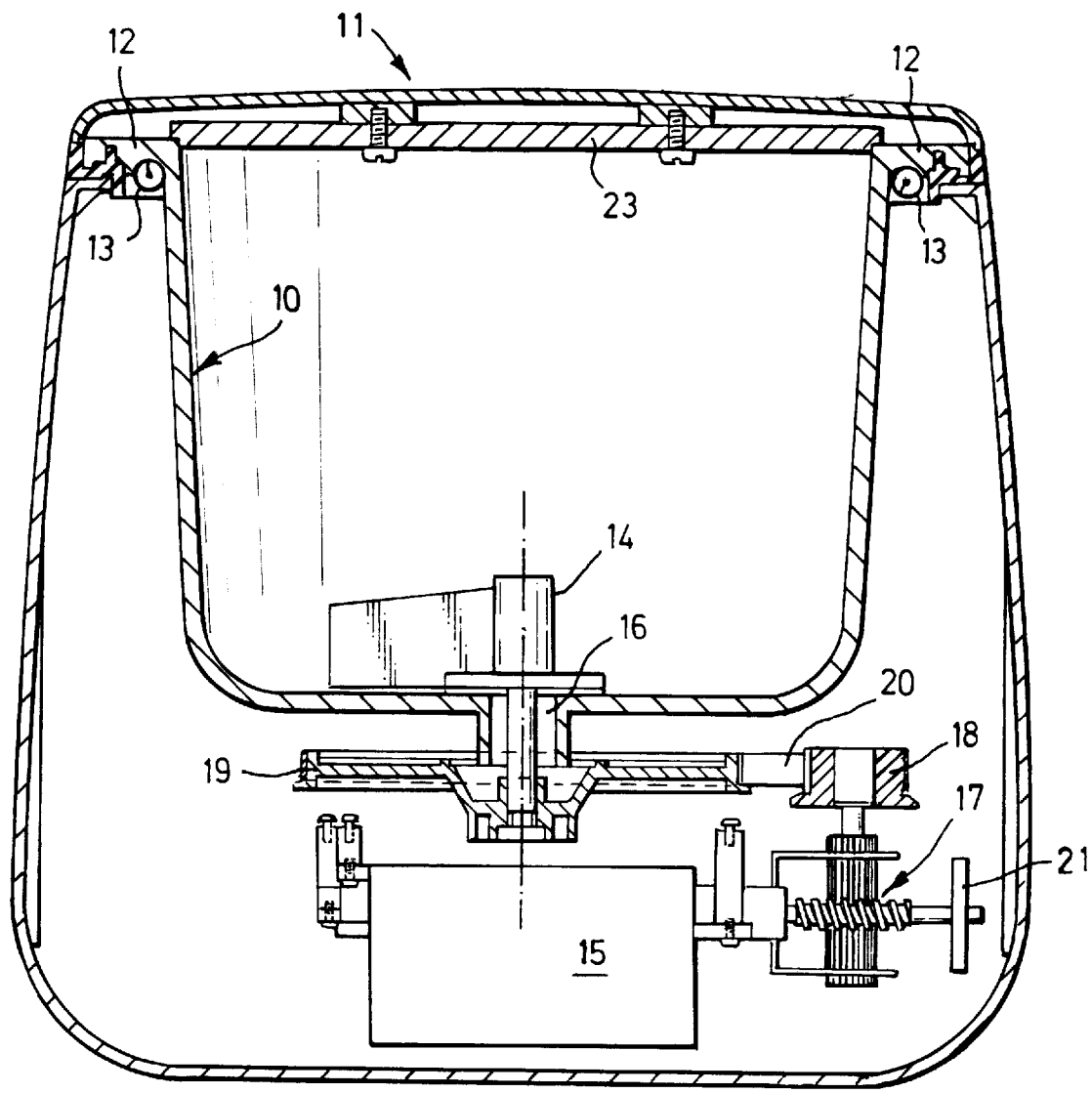
FIG. 1 is a sectional elevation of the breadmaker.

Referring to the drawings, in FIG. 1 a bread pan or container 10 sealing fits to in the top of a housing 11 and has at its upper surface a peripheral rim 12. An electric heating element 13 is bonded to the outer surface of the container 10, under the rim 12, so as to be positioned adjacent the top of the container and directly heat container in use.

Figure 2:
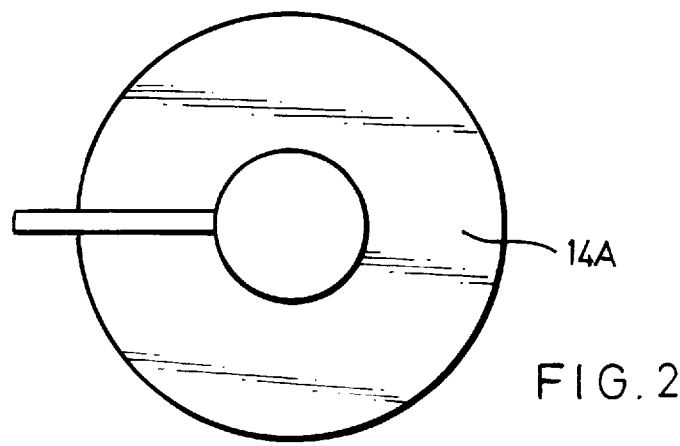
FIG. 2 is a top plan view of a paddle for the breadmaker.

A bread mixing and kneading paddle 14 (shown also in FIG. 2) is mounted in the bottom of the container 10. The base 14A has a relatively large surface area to facilitate removal of bread loaves as explained below. The paddle 14 is connected to a mechanical drive that extends through a central aperture for coupling to an electric motor 15 mounted inside the housing 11. The mechanical drive includes a liquid-tight shaft seal 16 below the paddle (especially so that the container 10 can also be used for cooking and mixing foodstuffs other than bread), a worm gear 17, two pulleys 18 and 19, and a drive belt 20. An auxiliary wheel 21 is mounted to rotate with the worm gear 17 in the described breadmaker which is accessible from externally of the housing 11. Generally with a suitable tool the wheel 21 can be manually rotated if the motor 15 stalls, but more particularly to rotate the worm gear in an opposite to normal rotational direction, if preferred without applying electric power, to lift the paddle 14 upwards, as will be explained below.

A lid 22 fits snugly to the top of the housing 11 and has an inner lower surface formed by a robust metal plate 23 that serves during the baking bread to conduct and direct heat from the element 13 downwards into the container 10. This is particularly helpful and ensures that the top of the loaf receives sufficient radiant heat to form a desirable top crust when the bread loaf is otherwise fully baked.

Normally the container 10 is permanently fixed and sealed to the housing 11. However, a suitable sealed arrangement can be achieved with the configuration generally as shown in FIG. 1 and enable removal of the container 10 upwards out of the housing. In that situation, the components including the mechanical drive and the motor 15 many be removed as a combined unit, or the parts be separated at the seal 16. The paddle is usually separately removable anyway especially to aid cleaning, and also in cases for cooking other foodstuffs and not required. In any event, where the container 10 is arranged to be removable (or indeed for ease of initial assembly), the electric element 13 may be connectable to its normal power supply by plug-and-socket connections. Such connections are suitably mounted so that they make and break as the container 10 is entered into or removed from the housing 11.

Where the container is permanently fixed to the housing, it is preferable to have means to aid the removal of a cooked bread loaf. This is carried out by lifting the bread loaf up; it is usually sufficient to raise the loaf only slightly to break the seal formed with the lower surface of the container 10. In one arrangement, the container 10 is provided with a number of very small apertures along and near its lower surface and using a manually operated hand pump or bellows blowing air through the apertures when required. Such an arrangement may not be wholly satisfactory in all circumstances, especially if the container 10 is required for use in cooking or mixing other foodstuffs and therefore other lifting aid arrangements may be used.

Figure 3:
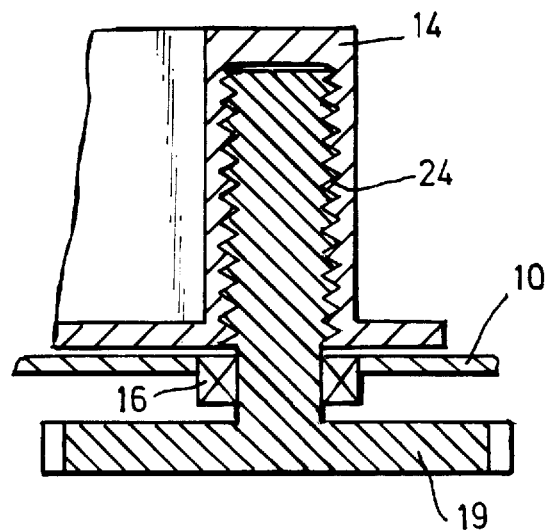
FIG. 3 is a sectional view of part of a mechanical drive for the paddle.

One such other arrangement is illustrated in FIG. 3. The paddle 14 is connected to the mechanical drive by a screw thread 24. It will be noted of course that the paddle 14 can therefore be readily removable for cleaning as already mentioned above. During normal mixing and kneading the paddle is driven in a clockwise direction and the paddle therefore remain tightened to the mechanical drive. At the end of baking, the mechanical drive is rotated anti-clockwise whereupon the paddle, being held stationary by the cooked loaf, unscrews along the thread 24. As a result, the paddle 14 is lifted upwards to raise the loaf away from the lower surface of the container 10. The anti-clockwise rotation can be achieved by reversing the motor 15, or manually by turning the wheel 21 as mentioned earlier.

Figure 4:
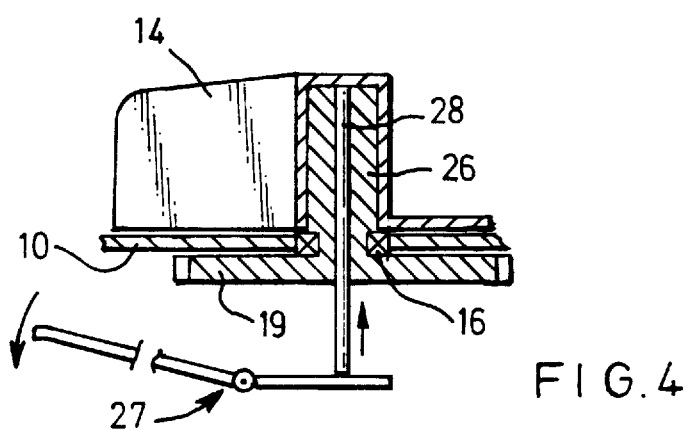
FIG. 4 is a sectional plan view of part of a level lifting arrangement for the paddle.

In another arrangement, see FIG. 4, the paddle 14 is slidable onto and keyed to a mechanical drive shaft 26. The paddle can therefore be lifted by a lever arrangement 27, a remote end of the lever being exposed externally of the housing 11. The drive shaft 26 is hollow and a lifting rod 28 is slidably mounted inside the shaft 26. When the lever arrangement is operated, the rod 28 pushes the paddle 14 upwards as required.

It is also possible to have a mechanical lifting arrangement that lifts the whole sub-assembly, including the drive pulleys and motor 15, upwards so as to raise the paddle 14 as required.

It will be noted that the bread pan or container 10, whether removable or not, is sealingly attached to the top of the housing 11. As a result it is impossible for any foodstuff or ingredients to enter inside the housing 11. Further, the heating element 13 is disposed and positioned to heat the container 10 directly. Heat losses are therefore minimized, as compared to prior art breadmakers, and the outside surfaces of the housing 11 are much less prone or likely to become dangerously or uncomfortably hot during use. It is quite normal to provide temperature sensors in breadmaker and control circuits to turn the heating elements ON and OFF as required in well-known manner. In the described arrangement however, any temperature sensors can be more accurately disposed to measure actual temperatures of the foodstuff and be generally safely insensitive to the temperature of the heating elements themselves. Further, the direct mounting of the heating elements against and to the outer surface of the container 10 provides simplicity in manufacturing and robust support for such elements once mounted.

In prior art breadmakers, it is normally a requirement to include some kind of a clutch in the mechanical drive. No clutch is necessary in embodiments of the present invention.

It will be appreciated that whereas the container 10 has been described as preferably having a heating element mounted adjacent the top of the container, the element 13 may be fitted lower down and/or additional heating elements fitted intermediate the height of the container 10. It is also possible using the described breadmaker to heat the outside surfaces of the container 10 using radiant heat or hot air.

Figure 5:
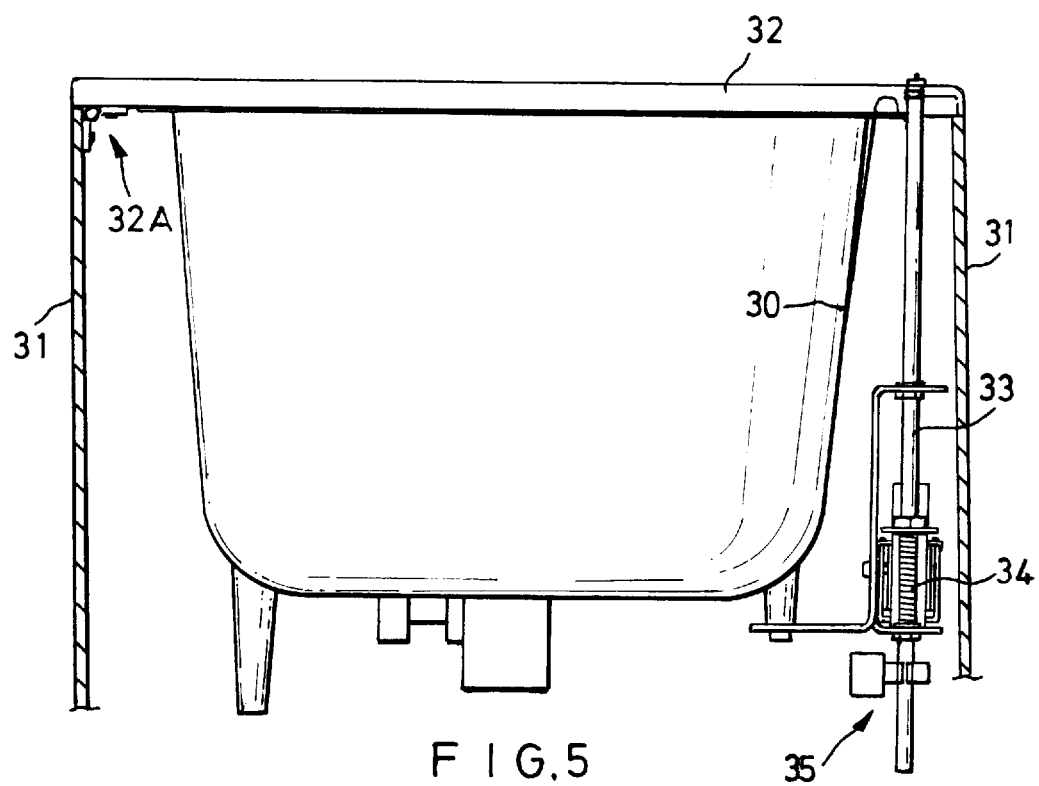
FIG. 5 is a partial sectional side view of part of a breadmaker of the present invention.

In FIG. 5, a container 30 that is surrounded by a housing 31 has a lid 32 connected by a hinge 32A to the housing 31. A plunger 33 is mounted at one side of the container 30 within the housing 31. The plunger 33 is biassed by a spring 34 and held in the position shown by an electrically releasable latch mechanism 35. When the lid 32 is pushed closed the latch mechanism 35 can be engaged to hold the plunger 33 down and when an electrical signal is applied to the latch mechanism 35, the plunger is urged upwards by the spring 34 to partially open the lid 32. The electrical signal is provided in practice by a controller (not shown) such that the lid opens soon after a baking cycle is completed so as to ventilate the inside of the container 30 allowing the bread to cool more naturally.

In the embodiment of FIG. 5, a ventilating means is therefor provided by arranging as described for the lid to be partially opened automatically at the end of each bread baking cycle. It is possible alternatively or additionally to arrange for the plunger to open a vent or an array of vents in the side of the container 30 or formed in the lid 32. It is also possible to arrange for the plunger 33 to be operatively moved in other ways, in particular an electrically operable solenoid may be used to directly urge the plunger upwards at the end of each baking cycle as required, to partially open the lid and/or open vents as appropriate.

Figure 6:
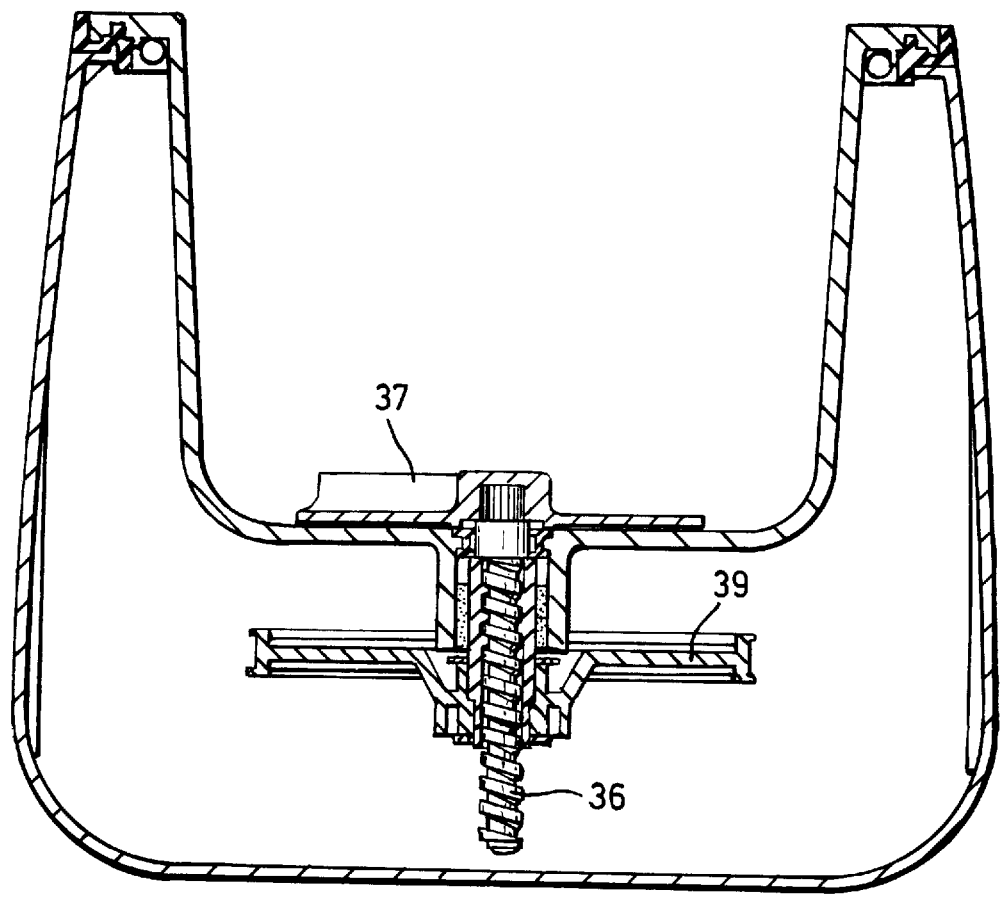
FIG. 6 shows a sectional view of part of another embodiment of the breadmaker of the present invention.

In FIG. 6, a lifting arrangement is shown which operates in the same manner as the lifting mechanism explained with reference to FIG. 3. Two aspects are however different, a threaded prong 36 is fitted directly to a paddle 37 (and not to a driving pulley 19 as shown in FIG. 3) and a paddle boss 38 protrudes a relatively short distance upwards (as compared to the boss of the paddle 14). This present embodiment not only enables the boss to be shorter but actually increases generally the amount of lift available at the end of each baking cycle. This is because the prong 36 can be relatively long, and extend well below the bottom of the container 10 or 30. For example in FIG. 3 the maximum practical length of the equivalent part 24 is determined by the height of the boss of the paddle.

In practice, the lifting of a baked loaf of bread is carried out by reversing the normal direction of rotation of the paddle drive arrangement which includes a geared disc 39. Thus, if the bread mixing cycles are carried out by rotating the paddle clockwise, then at the end of baking cycle a reverse direction of rotation is used to, in effect, unscrew the prong 36 and so lift the paddle upwards. It follows that if the normal direction of rotation for mixing is anti-clockwise, then the paddle must be lifted by clockwise operation of the drive mechanism, and the prong 36 must then be appropriately threaded with a left-handed thread.

It will be appreciated that the bread containers 10 or 30 are preferably somewhat trapezoidal in cross-section. If the baked bread loaf is lifted, its outer surfaces will therefore all separate at least to some extent out of contact with the sides of the containers. This allows the bread to cool more naturally and take up less atmospheric moisture than otherwise. This is because where the newly baked bread remains in contact with the more rapidly cooling sides of the container the bread will be unnaturally cooled, that is forcibly cooled, and tend to absorb moisture from its surroundings. Thus, in the described breadmaker the bread loaf can remain in the breadmaker for virtually any length of time after the end of a baking cycle. The user need not therefore attend the breadmaker so as to act at or near the end of each baking cycles to quickly remove the loaf for separate cooling. The bread loaf can be removed when required at leisure or when required to eat.

Figure 7:
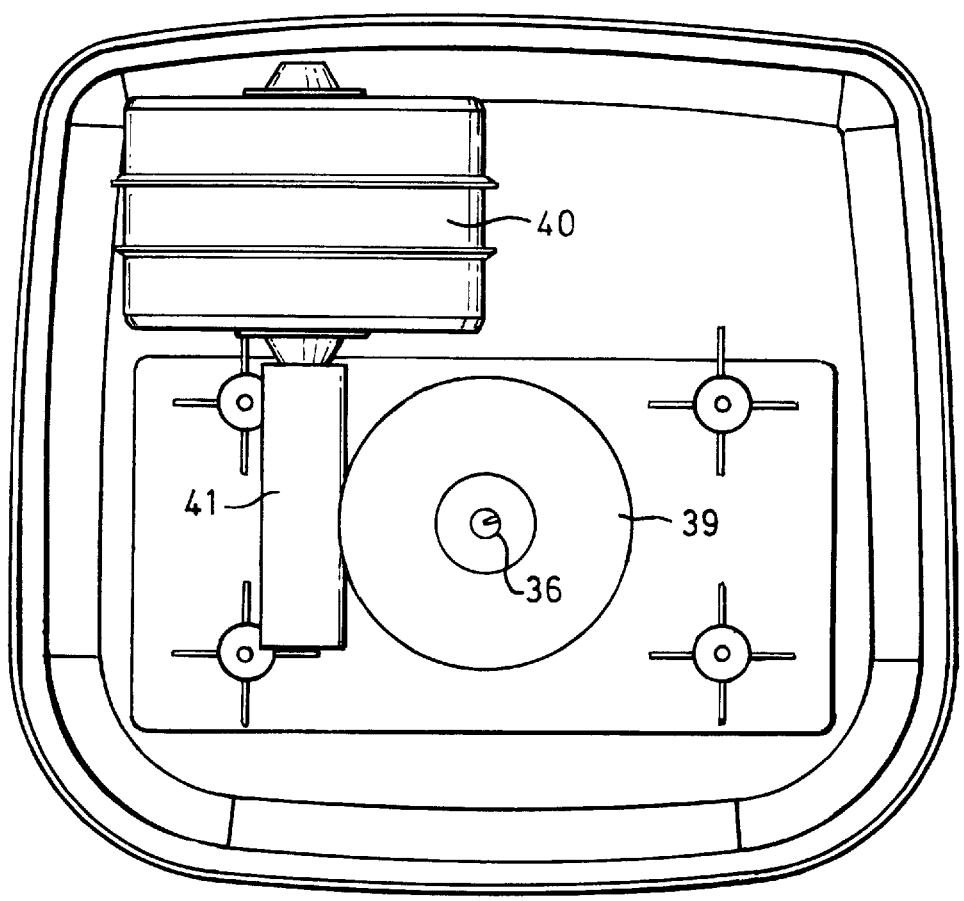
FIG. 7 shows an underplan layout of an embodiment of the breadmaker of the present invention.

In FIG. 7, an electric induction drive motor 40 has a worm gear 41 on a remote end of its rotor that engages directly with the peripheral gearing on the gear disc 39. The gear disc cooperates to drive the paddle 37 by engaging the threaded prong 36 aligned with its central axis. Such a drive arrangement allows the use of relatively low speed high torque induction motors to be used without multiple reduction gearing. It is presently very common practice to use a direct current motor and multi-gearing for a breadmaker which are noisy in operation. In contract, inherently quieter and more efficient running drive mechanisms can be provided in embodiments of the invention.

Embodiments of the invention incorporate electrical programme controllers to provide appropriate cycling of the operations of the paddles 14 and the heating elements 13 and also normal safety cut-outs in manners known per se. Such aspects of the breadmaker have therefore not been described in full, as they form no part of the present invention.

We claim:

1. An electrical breadmaker comprising:

a container for receiving bread mix sealingly mounted to a top of a housing;

heating means arranged to heat an outer surface of said container for heating bread mix in said container;

a paddle in a bottom of said container for connection to a mechanical drive extending through a central aperture therein into said housing;

an electric motor arranged to be coupled to said mechanical drive for rotating said paddle; and lifting means attached to said paddle for raising a bread loaf after baking, said lifting means further comprising a threaded prong supporting said paddle attached to a threaded paddle driving boss adapted to unscrew and lift said paddle whenever said driving boss is rotated in a reverse direction.

2. The electrical breadmaker of claim 1 further comprising:

a ventilating means attached to said container automatically openable to vent said container at an end of a baking cycle.

3. The electrical breadmaker of claim 2 wherein said ventilating means further comprises:

a lid attached to a top of said container; and an operating plunger mounted at a side of said container arranged to partially open said lid.

4. The electrical breadmaker of claim 1 further comprising:

a circular geared disc mounted below said container having a central shaft mechanically coupled to drive said paddle; and said electric motor having a rotor with worm drive mounted at one end coupled to said geared disc.

* * * * *